Feb. 21, 1950     G. R. COSS     2,498,395
HIGH-PRESSURE SWIVEL HOSE COUPLING
Filed Nov. 21, 1946
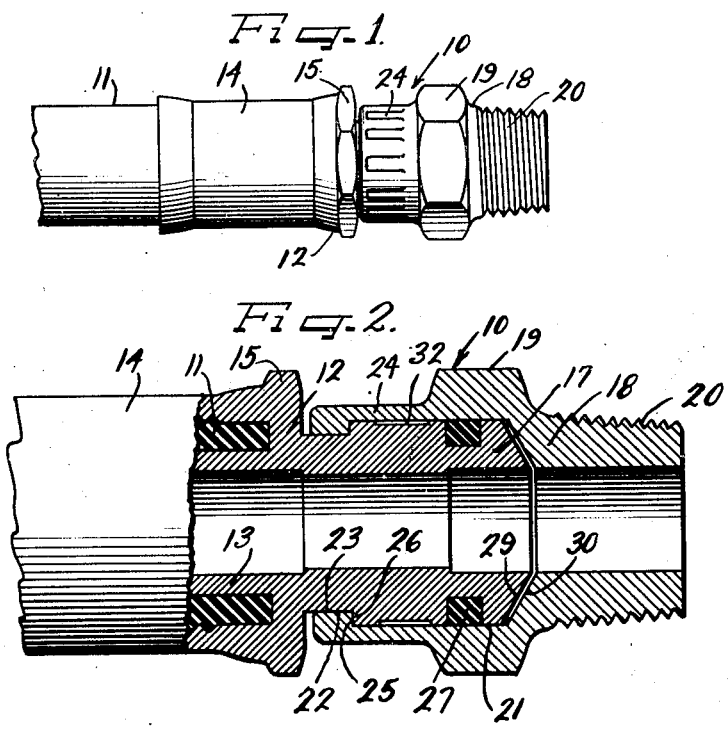
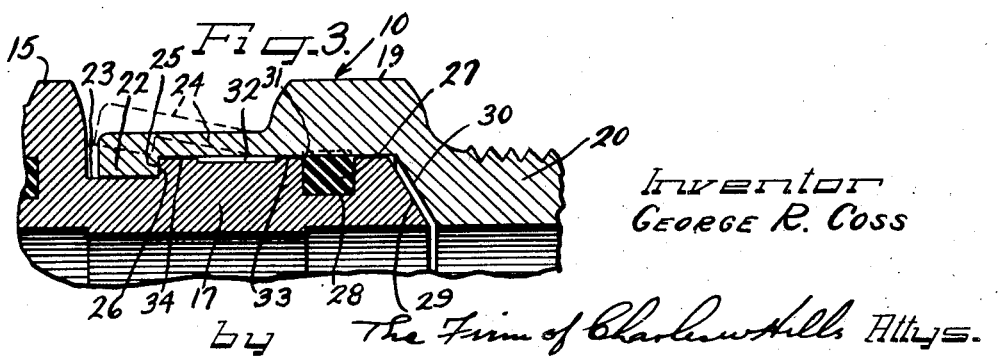
Inventor
GEORGE R. COSS
by The Firm of Charles W. Hills, Attys.

UNITED STATES PATENT OFFICE 2,498,395

HIGH-PRESSURE SWIVEL HOSE COUPLING

George R. Coss, St. Clair Shores, Mich., assignor to Flex-O-Tube Company, Detroit, Mich., a corporation of Illinois Application November 21, 1946, Serial No. 711,452

2 Claims. (Cl. 285—75)

This invention relates to improvements in high pressure, swivel hose couplings and more particularly to such couplings adapted for use with flexible hose.

Among the requirements in swivel couplings for high pressure hose are those of adequate strength to resist high service pressures without undue complexity of structure, freedom of swiveling action for coupling purposes and yet adequate sealing against leakage under the service pressures, and suitability for manufacture at reasonable cost by mass production methods.

It is, accordingly, an important object of the present invention to provide a high pressure swivel hose coupling which meets all of the foregoing requirements by means of certain improved structural features.

Another object of the invention is to provide a high pressure swivel hose coupling in which the principal components are separately formed one piece elements which are mutually interconnected in a novel manner to afford a high degree of pressure resistance, freedom from leakage, and high general operating efficiency.

A further object of the invention is to provide a high pressure swivel hose coupling which may be made as a pair of swively connected members affording the entire structure, with the exception of packing where that is required, and eliminating such expedients as pilot tubes or more than two machined parts to provide the working assembly.

Still another object of the invention is to provide an improved swivel joint in a high pressure swivel hose coupling assembly.

Yet another object of the invention is to provide improved sealing structure in a high pressure swivel hose coupling joint.

It is also an object of the invention to provide in a high pressure swivel hose coupling an improved mutually pressure resistive interconnection between the swivelling parts.

Other objects, features and advantages of the present invention will be readily apparent from the following description taken in conjunction with the accompanying one sheet of drawings, wherein:

Figure 1 is a side elevational view of a swivel hose coupling embodying the features of the present invention;

Figure 2 is an enlarged, fragmentary axial sectional view through the hose coupling;

Figure 3 is a fragmentary, further enlarged, axial, sectional view through one side of the swivel joint of the coupling.

A swivel coupling 10 (Figs. 1 to 3) embodying the features of the present invention is adapted to be secured to the end of a high pressure flexible hose 11. For this purpose, the coupling 10 includes a tubular body 12 preferably formed as a one piece metal screw machine part having an integral tubular stem insert 13 at one end adapted to fit within the end of the hose and to which the hose end is clamped securely by an integral skirt, 14, contracted about the hose in any preferred manner as by swedging or crimping. A radially outwardly extending wrench shoulder 15 formed at the juncture of the stem and skirt adapts the body 12 to be held by a suitable wrench for assembly purposes.

An integral, cylindrically tubular head 17 on the body 12 and extending coaxially opposite to the stem 13 is formed to mate with a tubular swivel member 18 which is also preferably formed as a one piece metal screw machine part. An outwardly radial wrench shoulder 19 intermediately formed on the swivel member 18 is adapted to be engaged by a wrench for turning the same to effect a screw connection between an externally threaded, tubular nipple 20 on the swivel member with a female coupling on a second piece of hose (not shown) or an inlet or outlet of apparatus with which the hose 14 is to be connected in a high pressure fluid circuit.

The head 17 and the swivel member 18 are swively connected in such a manner as to be capable of safely withstanding high service or line testing pressures in excess of the pressure at which the hose 11 will burst, and, further, in such a manner as to prevent leakage through the joint therebetween during service. To this end, the head 17 is formed of substantial length while the swivel member 18 is formed with a counterbore 21 complementary to the head and adapted to receive the same in freely rotatable fashion, with the main bore of the swivel member coterminous with the bore of the body 12.

A mutually interlocking connection between the head 17 and the swivel member 18 is effected by means of a radially inwardly projecting, annular, connecting or retaining flange 22 at the terminal of the swivel member and fitting in a slightly wider annular radially outwardly opening groove 23 formed at the base of the head 17. For adequate resistance to longitudinal separating thrusts that may be imposed upon the coupling in service, the flange 22 is formed with a relatively large mass of metal, in the present instance being substantially wider and thicker than the adjacent wall of the counterbored portion of the swivel member. Such wall is in the form of a skirt 24 joining the flange 22 and the shoulder 19 integrally. For example, where the skirt wall thickness is adequate to withstand some longitudinal pull or thrust generated by internal pressures of up to 30,000 pounds per square inch and tending, of course, to draw the swivel coupling members longitudinally apart, a width and thickness of the flange 22 equal to approximately twice the thickness of the skirt wall has been found quite satisfactory. Thereby, the mass of metal in the flange portion 22 is great enough to withstand the pressure-induced thrust imposed thereon through an axial shoulder 25 which opposes an axial shoulder 26 on the head 17 defining the outer side of the groove 23. In other words, the mass of metal in the flange portion 22 is enough to back up the swivel shoulder 25 with ample resistance to deformation to withstand service forces which might tend to turn the flange portion out of the groove 23.

By having the head 17 of substantial length, ample longitudinal, cylindrical, bearing area is provided by the head and the opposing complementary inner counterbore wall of the swivel member 18 to afford a free working swivel bearing which is virtually free from any tendency of the swivel member and the body 12 rocking relatively.

Furthermore, by having the counterbore 21 of substantial length and the skirt 23 formed with a relatively thin wall, assembly of the swivel member about the head 17 is substantially facilitated. Thus, it is practicable to form the flange portion 22 and the skirt 24 initially on an internal diameter flared open sufficiently to clear the outside diameter of the head 17 for free longitudinal assembly purposes, as demonstrated in broken outline in Fig. 3. Final assembly is then accomplished by crimping or swedging the flared connecting flange portion 22 and the skirt 24 radially inwardly to contract them until the flange 22 is interlockingly disposed in the retaining groove 23.

An advantage of this method of assembling the coupling member is that a relatively large manufacturing tolerance may be allowed for screw machine production of the parts but in the finally assembled relationships thereof the radially inward swedging contraction of the head-engaging portion of the swivel member 18 takes up any excess tolerance and assures a desirable close bearing relationship between the opposing cylindrical bearing surfaces. Experience has shown that the best results are obtained for high pressure operation where the radial bearing clearance is not over .002 inch and preferably as close to .001 inch as practicable. This clearance relationship is desirable in the coupling 10.

Such a very close clearance between the radial bearing surface of the head 17 and the opposing internal bearing surface afforded by the bore 21 of the swivel member is highly advantageous in providing for a pressure fluid seal. Such a seal in the first instance comprises means such as a sealing ring 27 held under radial sealing compression within a radially outwardly opening annular groove 28, preferably formed in the head 17 adjacent to its outer extremity, and sealingly opposing the surrounding area of the bearing surface within the counterbore 21. As shown in Fig. 3, for example, the sealing ring 27 is adapted to be compressed in assembly from the broken outline position to the full line position wherein it substantially fills the groove 28, the depth of the groove being slightly less than the initial thickness of the sealing ring 27 seated therein. Any suitable resilient material such as rubber or synthetic rubber may be employed in the sealing ring 27. Under line pressure in service, some of the pressure fluid may escape into the joint between the head 17 and the swivel member 18 past opposing tapered shoulders 29 and 30 on the end of the head 17 and at the inner end of the counterbore 21, respectively. In the joint such pressure fluid exerts against the exposed side of the compressed sealing ring 27 and tends to force it axially outwardly whereby the opposite or atmosphere side of the ring tends to wedge sealingly into the small clearance space between the radial bearing surfaces of the head and the swivel counterbore 21, substantially as indicated at 31 in Fig. 3. When the pressure is released, the inherent resilience of the sealing ring 27 tends to cause it to retract from said wedging, sealing relation whereby to relieve the radial bearing surfaces for relative rotation of the swivel member 18 and the head 17.

It will be seen that the very close tolerance attained between the radial bearing surfaces of the head 17 and the swivel 18 and especially at the atmosphere side of the sealing gasket ring 27 substantially contribute to the effective, wedging, sealing action of the sealing ring under the influence of the internal line pressure through the coupling. This sealing action is quite effective irrespective of rather large axial tolerance between the parts.

As will be perceived from Figs. 2 and 3, the only portion of the joint between the head 17 and the swivel member 18 which is subject to high fluid pressure, that is pressureward from the gasket 27, is backed up solidly by the relatively great mass of metal in the shoulder 19 and in the base of the integral nipple 20. This, together with the strong resistance afforded by the flange 22 to thrust that may develop from fluid pressure between the end shoulders 29 and 30, assures an extremely high safety factor.

In order to relieve the relatively long, opposed, radial, bearing, surface areas of the head 17 and the skirt portion 24 of the swivel member 18 between the flange 22 and the gasket 27 from any possible undue frictional resistance to free swivelling because of the very close tolerance attained between said radial bearing surfaces, a shallow, relief groove 32 may be formed in one of the opposed, bearing surface areas, preferably in the bearing area of the head 17. Such a groove leaves radial bearing areas at the opposite sides thereof on the head 17 as indicated at 33 and 34.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a swivel coupling assembly a tubular body having a stem or head projecting axially from one end thereof and formed with a radially opening groove at its base, a swivel member rotatably encircling said head and having a radially inwardly extending annular flange at its inner end interlockingly received within said groove, said swivel member having a relatively thin skirt portion adjacent to said flange and said flange being substantially wider and thicker than the thickness of said skirt portion whereby to resist deformation out of said groove by axial thrust imposed thereon during use and tending to draw the body and swivel member apart, said flange being contracted radially into said groove from an initially greater diameter and holding said skirt to a close swivel clearance relative to the head, and a sealing ring between the bearing surfaces of said head and said swivel member axially spaced inwardly from said groove and adapted to be wedged into fluid tight, sealing relation within said clearance by internal fluid pressure from within the coupling, the opposed, radial, bearing surfaces of the head and the swivel member having a clearance groove intermediate the flange-receiving groove and the sealing gasket to prevent binding between said skirt portion and said head.

2. In combination in a high pressure swivel hose coupling adapted to withstand strong internal pressures, a tubular body member having a head portion and a radially outwardly opening annular groove spaced substantially from the tip of the head portion, and a swivel member encompassing said head portion rotatably, said swivel member having an enlarged wrench shoulder portion surrounding the extremity of the head portion and extending to a point spaced axially from the tip of the head portion and intermediate the tip of the head portion and said groove, the remainder of the swivel member from said point to and about said groove comprising a skirt of such thinness as to be readily contractible from a substantially larger head clearing diameter but yet thick enough to withstand the internal pressure thrust for which the assembly is rated and having a radially inwardly extending annular flange extremity interlockingly engaged within said groove, said flange comprising a thrust resistant shoulder portion which is a multiple both in thickness and in width of the thickness of said skirt whereby to resist effectively displacement from said groove due to high pressure thrust forces acting between said body member and said swivel member, said head portion having a second groove adjacent to the tip thereof opening annularly toward said wrench shoulder portion of the swivel member and with a sealing ring under compression within said groove in engagement with the surrounding wall of the swivel member.

GEORGE R. COSS.

REFERENCES CITED

The following references are of record in the file of this patent:

UNITED STATES PATENTS

| Number | Name | Date |
| --- | --- | --- |
| 244,804 | Gillespie | July 26, 1881 |
| 964,579 | Stephens | July 10, 1910 |
| 1,029,104 | Clark | June 11, 1912 |
| 1,253,309 | Ulleland | Jan. 15, 1918 |
| 1,297,719 | Meyers | Mar. 18, 1919 |
| 1,315,484 | Fesler | Sept. 9, 1919 |
| 1,775,055 | Tarbox et al. | Sept. 2, 1930 |
| 2,008,096 | Clo | July 6, 1935 |
| 2,144,117 | Miller | Jan. 17, 1939 |
| 2,417,350 | Conroy | Mar. 11, 1947 |